United States Patent
Mielke, Jr.

[11] 3,712,293
[45] Jan. 23, 1973

[54] APPARATUS AND METHOD FOR MEASURING HEMOSTATIC PROPERTIES OF PLATELETS

[76] Inventor: Clarence Harold Mielke, Jr., 10 Ludwig Road, Needham Heights, Mass.

[22] Filed: July 27, 1970

[21] Appl. No.: 58,252

[52] U.S. Cl. .................. 128/2 G, 30/293, 30/294, 128/305
[51] Int. Cl. .............................. A61b 10/00
[58] Field of Search ....... 128/2 R, 2 G, 2 B, 305, 314, 128/316, 325, 333; 30/293, 294

[56] References Cited

UNITED STATES PATENTS

| | | | |
|---|---|---|---|
| 2,932,296 | 4/1960 | Sanders | 128/305 |
| 3,192,624 | 7/1965 | Gringer | 30/293 X |
| 3,045,348 | 7/1962 | Dungan | 30/293 X |
| 1,843,535 | 2/1932 | Arnold | 30/293 X |
| 3,448,519 | 6/1969 | Tobias | 30/293 |
| 1,255,860 | 2/1918 | Courter | 30/293 X |
| 2,556,036 | 6/1951 | Jensen | 128/305 |
| 1,996,224 | 4/1935 | Wedekind | 30/293 X |
| 2,092,812 | 9/1937 | Nemzek | 128/314 |
| 2,145,985 | 2/1939 | Krajicek | 30/294 |

OTHER PUBLICATIONS

Mielke, C. H., et al., Blood The Journ. of Hematology, Vol. 34, No. 2, Aug., 1969, pp. 204–215.

*Primary Examiner*—Kyle L. Howell
*Attorney*—Chittick, Pfund, Birch, Samuels & Gauthier

[57] ABSTRACT

An apparatus and method for making a standardized reproducible blade incision in the subject's forearm for the purpose of measuring his bleeding time. A blade is precisely mounted on the blade holder by use of a gauge block, and a flat template with standard thickness and standard length of slot is used to guide the blade and limit the depth and length of incision.

4 Claims, 9 Drawing Figures

PATENTED JAN 23 1973 3,712,293
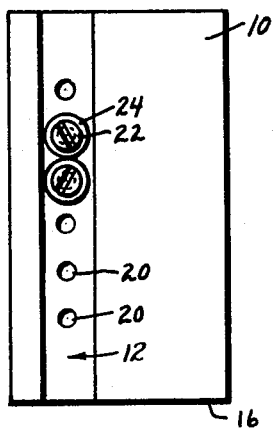
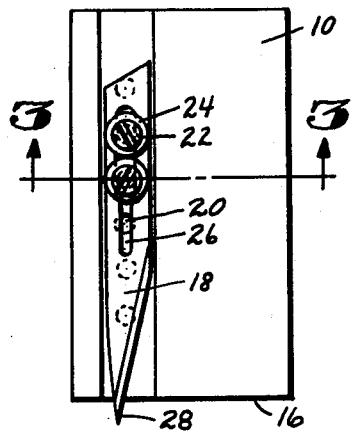
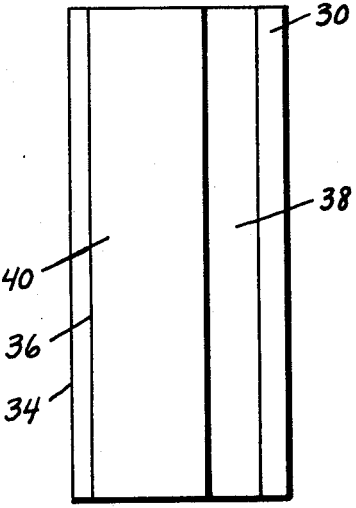
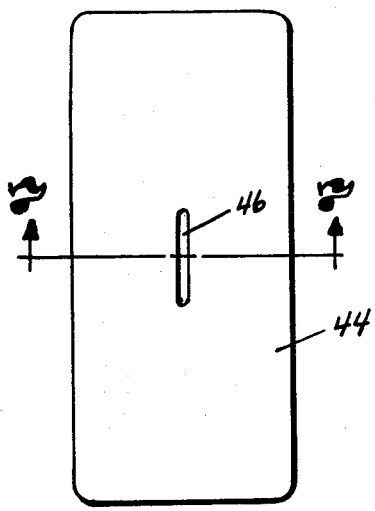
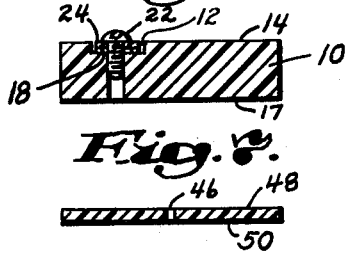
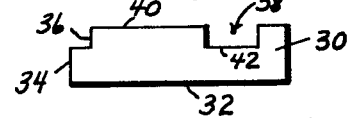
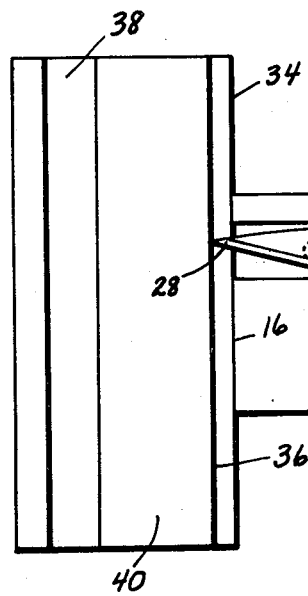
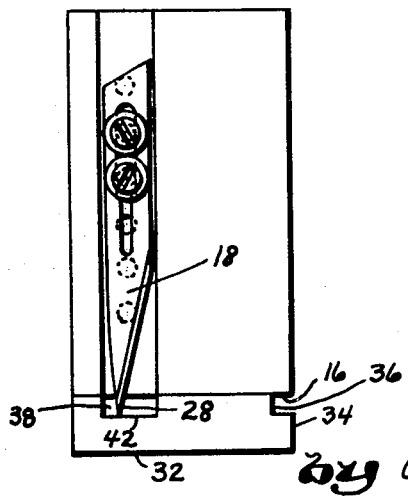
Inventor:
C. Harold Mielke, Jr.
by Chittick, Pfund, Birch, Samuels & Gauthier
Attorneys

APPARATUS AND METHOD FOR MEASURING HEMOSTATIC PROPERTIES OF PLATELETS

BACKGROUND OF THE INVENTION

When blood vessels are cut or injured, the resulting bleeding continues for a length of time before hemostasis is complete, i.e., the flow of blood has ceased. Most people have what can be termed normal bleeding times. However, some people who suffer from bleeding disorders experience abnormally long bleeding times. It is important to have a standardized, inexpensive and simple clinical testing method and apparatus to determine hemostatic capability in advance of any surgical operation or similar procedure.

Also, it has been found that the ingestion of aspirin before surgery impairs hemostasis to a decided extent. Mielke et al. have reported their findings in *Blood*, Vol. 34, No. 2 (August, 1969). Further research and statistical analysis in this and related areas requires a standard reproducible testing procedure.

SUMMARY OF THE INVENTION

This invention provides a method and apparatus for determining bleeding times including a blade, a blade holder, a gauge and a template. The blade is precisely located on the blade holder by use of a gauge block so that the blade protrudes beyond the face of the holder a standard distance. An incision guide template has a standard thickness and has a standard length slot. The blade holder and template are used in combination to provide a standard reproducible incision on the subject's forearm from which the bleeding time can be measured.

BRIEF DESCRIPTION OF THE DRAWING

FIG. 1 is a plan view of the blade holder of this invention;

FIG. 2 is a plan view of the blade holder with the blade mounted thereon;

FIG. 3 is a view in section taken through FIG. 2;

FIG. 4 is a plan view of the gauge block;

FIG. 5 is an end elevation of the gauge block;

FIG. 6 is a plan view of the template;

FIG. 7 is a view in section taken through FIG. 6;

FIG. 8 is an end elevation of the other end of the gauge block shown in FIG. 5 with the blade holder and blade of FIG. 2 being shown in a vertical position; and FIG. 9 is a plan view of the gauge block shown in FIG. 4 revolved 180° with the blade holder and blade of FIG. 2 being shown in a horizontal position.

DESCRIPTION OF THE PREFERRED EMBODIMENT

Hemostasis occurs at varying rates in any population. The first step of hemostasis after blood vessels are cut or injured is the adhering of the platelets to exposed collagen and then to each other to form aggregates called primary hemostatic plugs. These plugs stop the bleeding from the cut vessels. Thus, bleeding time is the length of time it takes the platelets to function to arrest the bleeding from cut blood vessels.

Diagnosis of bleeding disorders and research both require a standard tool to determine whether a subject's platelets function normally. Applicant's invention provides such a tool which is both a standardized procedure and a standard instrument package.

Referring to the drawings, FIG. 1 and 3 show a blade holder 10 which is a generally rectangular block with a blade mounting slot 12 (also called a blade receiving portion) milled longitudinally in its left side surface 14. The shape and material of blade holder 10 are, generally speaking, not critical to the invention (except as limited by the claims). Preferably, the blade holder is made of an inexpensive, sterilizable, easily fabricated material such as polystyrene and the shape should be comfortable for the hand to grip. A convenient size for the blade holder has been found to be 4.5 cm. long, 2.5 cm. wide and 0.6 cm. thick.

It is important for blade holder 10 to have a lower planar bearing surface 16 which is sufficiently smooth to present a low friction bearing surface for riding across the upper surface of the template and is sufficiently flat and broad to be stable and free from rocking or tipping. The blade holder lower surface 16 should be perpendicular to the blade mounting slot 12, as shown in FIG. 1. The blade holder preferably has a flat right side surface 17 as can best be seen in FIG. 3. Slot 12 is formed in the left side surface 14 of blade holder 10 and its purpose is to facilitate the mounting of blade 18 on the blade holder. It should be understood that the slot can optionally be omitted altogether in the practice of this invention, with left side surface 14 constituting the blade receiving portion. However, the provision of a slot in the blade holder increases the ease and convenience of the blade mounting procedure. The preferred size of slot 12 is 6 mm. wide and 1 mm. deep, with the slot being open at both ends. In any event, the slot must be open at lower surface 16 so that blade 18 can protrude as shown in FIG. 2. A series of threaded bolt holes 20 are tapped into slot 12 at intervals. Two bolts 22 and two washers 24 (both stainless steel) are sized to fit holes 20. Although only two bolts are needed to mount the blade on the blade holder, approximately five holes are provided 2 mm. apart to accomodate the various types and sizes of blades available.

A thin blade 18 is used, such as a No. 11 Bard-Parker, A-S-R or similar disposable blade. The blade has a longitudinal aperture 26 wide enough for bolts 22 to pass. It will be seen in FIGS. 1–3 that blade 18 is mounted by first positioning it in slot 12 with the pointed blade tip 28 extending beyond lower planar bearing surface 16. Then, washers 24 are placed onto bolts 22 and the bolts are passed through blade aperture 26 and screwed into holes 20. The bolts are left sufficiently loose to permit longitudinal movement of the blade within the slot when slight pressure is subsequently applied to the blade.

It is very important that each time an incision is made, the blade tip 28 protrudes beyond lower planar bearing surface 16 the identical distance to ensure that the incision will always be the same depth. To achieve such a mounting position for each disposable blade, no matter its type or size, a gauge 30 is used. Obviously, various types of gauges could be used, but the preferred embodiment of this invention is in the form of a solid block of hard metal, such as steel or aluminum as shown in FIGS. 4 and 5. This block has approximately the same dimensions as blade holder 10.

Gauge 30 has a flat lower surface 32 (FIG. 5) and a vertical abutment surface 34 adapted to fit flush against lower surface 16 of blade holder 10 as shown in FIG. 9.

Surface 34 must be straight and is preferably entirely in a vertical plane although it could be simply an edge. Gauge 30 also has a vertical blade tip-engaging surface 36 located at a vertical height equal to the vertical height of blade 18. Compare FIG. 3 with FIG. 5 to see how the FIG. 9 engagement is carried out. Surface 36 is precisely set back 2.5 mm. from surface 34 which constitutes one of the three critical standard measurements.

After gauge block 30 is moved against blade holder 10, as shown in FIG. 9, the loosely mounted blade 18 is longitudinally positioned so that blade tip 28 remains pressed against vertical gauge surface 36. While light pressure on the blade keeps it against vertical surface 36, pressure is also exerted to keep blade holder surface 16 against gauge block surface 34. While these two pressures are maintained, the bolts 22 are tightened with a screwdriver or similar tool to immobilize the blade on the blade holder with the tip protruding beyond the holder lower surface 16 precisely the 2.5 mm. distance which exists between the gauge block's abutment surface 34 and its tip-engaging surface 36.

An optional feature of this invention is a confirming gauge measurement to double-check the fact that blade 18 protrudes exactly 2.5 mm. This is accomplished by employing a recessed portion, specifically a milled slot 38, formed in the upper surface 40 of gauge 30. As shown in FIG. 8, blade holder 10 is positioned vertically so that its lower surface 16 spans milled slot 38 of gauge block 30 with blade 18 protruding into the slot. Just as gauge surface 36 is set back 2.5 mm. from surface 34, the bottom surface 42 of slot 38 is set back from 2.5 mm. from the gauge upper surface 40. Thus, when blade holder 10 is positioned as shown in FIG. 8, the proper blade location can be verified by noting that no light appears between blade tip 28 and bottom surface 42 and that no tipping or rocking occurs to upset the flash seating of blade holder surface 16 upon gauge upper surface 40. The appearance of light shows that the blade protrudes too little while the tipping shows that the blade protrudes too much.

A template 44, preferably of polystyrene material is shown in FIG. 6. The template should be approximately 5.5 cm. long and 2.5 cm. wide. These dimensions can be varied without affecting the invention. However, the thickness of the template is precisely 1.5 mm. which is the second critical standard measurement of this invention. It will be appreciated that if blade 18 protrudes exactly 2.5 mm. beyond blade holder surface 16, and template 44 is exactly 1.5 mm. thick, blade tip 28 will protrude exactly 1 mm. below the template bottom surface. The thickness of the template is the vertical dimension as shown in FIG. 7.

A template slit 46 is formed in the template and is open at template upper horizontal surface 48 and lower horizontal surface 50. It is important that these two surfaces be substantially parallel. Template slit 46 is precisely 11 mm. long which is the third critical standard measurement of this invention. The width of the slit is approximately 1mm. This width is sufficiently wide to accomodate blade 18 without binding, yet narrow enough to provide guidance for a straight line incision.

METHOD OF OPERATION

The procedure to determine the bleeding time of a subject begins with seating the subject with his elbow slightly flexed and with his forearm resting on a steady support with the volar or palm side surface exposed. A sphygmometer is placed above the antecubital fossa. The forearm is gently cleansed with an alcohol sponge and permitted to air dry. The cuff is then inflated to 40 mm. Hg. After a wait of 30 seconds, template 44 is placed on the forearm about 5 cm. distal to the antecubital fossa with template slit 46 running parallel to the antecubital crease. Template 44 is pressed firmly against the skin to flatten the skin surface. Blade 18 is inserted vertically at one end of template slit 46 and the underlying skin is penetrated. The blade holder bearing surface 16 is pressed flush against template upper surface 48. The incision is then made with a smooth rapid movement along the entire length of slit 46. This procedure is repeated to produce two parallel incisions approximately 1.5 cm. from each other. Care is taken to avoid superficial veins. Stop watches are started immediately after each incision is made. The incisions are blotted with filter paper strips, without touching the wound edges, every 30 seconds until blood no longer stains the filter paper. The mean of the times for the individual incisions is the bleeding time.

The gauge block 30 and template 44 are washed in warm soapy water after each use, stored in a 70 percent alcohol solution and dried with a sterile sponge immediately before use again. Only blade 18 actually contacts exposed tissue and the blade is discarded after each use. Since the incision does not begin to bleed until between 5 or 10 seconds after the cut is made, blood does not contaminate the template or blade holder. If contamination does occur accidentally, the equipment should be washed as previously described and then autoclaved with gas.

The foregoing method and apparatus produces a standard reproducible incision measuring 9 mm. in length and 1 mm. in depth. The length is less than the length of the slit because of the v-shaped blade angle. The equipment can be used by a left handed or right handed tester. Normal bleeding time has been demonstrated to be approximately 5 minutes with a two standard deviation range of approximately 2 ½ minutes to 10 minutes.

The components of this invention lend themselves to being packaged in a small transparent container, such as styrene. The blade holder, gauge and template are all approximately the same length and width and stack compactly. The container is preferably hinged and a sealed disposable blade can be conveniently included in the container for marketing purposes.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. Apparatus for clinically testing the bleeding time of a human subject comprising, in combination:

a. a blade holder having a handle, a lower horizontal planar bearing surface, and a blade receiving portion open at said planar bearing surface;
b. means on said blade holder for mounting a cutting blade on said blade receiving portion at a predetermined, specific location;
c. a cutting blade having a pointed tip and an angled cutting edge extending away from said tip, said blade being mounted on said blade holder by said mounting means in a predetermined, specific position in which said blade tip protrudes beyond said horizontal, planar bearing surface of said blade holder by a predetermined, specific distance, the plane of said blade being perpendicular to said planar bearing surface; and
d. a template having parallel upper and lower horizontal planar surfaces, and walls forming a straight, vertical blade slit open at said upper and lower planar surfaces, the width of said slit being slightly greater than the width of said cutting blade, said blade tip being removably inserted through said template slit, and said blade holder planar bearing surface being slidably positioned flush against said template upper horizontal planar surface, whereby the tester may firmly press the template against the volar side of the subject's forearm with one hand, grip the blade holder with the other hand, insert the blade tip vertically at one end of the template slit, penetrate the subject's skin with the blade tip to a depth at which the blade holder planar bearing surface is positioned flush against the template upper horizontal surface, draw the blade along the length of the template slit to the other end of the slit, withdraw the blade vertically from the slit, remove the template, and measure the time which elapses until the resulting bleeding ceases.

2. Apparatus of claim 1 wherein said cutting blade has an aperture formed therein and said blade holder mounting means includes at least one bolt adapted to pass through said blade aperture into threadable engagement with said blade holder to immobilize said blade thereon.

3. A method for clinically testing the bleeding time of a human subject comprising the following steps:
   a. mounting a cutting blade on a blade holder which has a lower horizontal planar bearing surface, said blade being mounted in a predetermined, specific position in which the cutting tip of said blade protrudes beyond said horizontal planar bearing surface of said blade holder by a predetermined, specific distance;
   b. pressing a template against the volar side of the subject's forearm, said template having a blade slit formed entirely therethrough, said blade slit having a predetermined, specific length and depth;
   c. inserting said blade cutting tip through said template blade slit at one end of said slit, and vertically penetrating the subject's skin by pressing said blade holder downwardly until said blade holder lower horizontal planar bearing surface is positioned flush against the upper horizontal surface of said template;
   d. drawing said blade holder smoothly and rapidly along the length of said template blade slit to the other end of said slit to cause said blade to make an incision of a predetermined, specific, uniform length and depth in the subject's skin;
   e. withdrawing said blade vertically from the subject's skin and removing said template from the subject's skin; and
   f. measuring the time which elapses between when the blade is withdrawn and when the resulting bleeding ceases.

4. The method of claim 3 including the following additional step: blotting the incision bleeding with filter paper strips without touching the incision edges until blood no longer stains the filter paper.

* * * * *